March 12, 1935. E. S. SAVAGE Re. 19,499

WHIRLING TOY

Original Filed Feb. 5, 1934

INVENTOR
Edward S. Savage.
BY
Russell B. Griffith
ATTORNEY

Reissued Mar. 12, 1935 Re. 19,499

UNITED STATES PATENT OFFICE 19,499

WHIRLING TOY

Edward S. Savage, Rochester, N. Y., assignor to Louis Marx & Company, a corporation of New York Original No. 1,963,001, dated June 12, 1934, Serial No. 709,814, February 5, 1934. Application for reissue December 12, 1934, Serial No. 757,220

16 Claims. (Cl. 46—14)

My present invention relates to mechanical toys and more particularly to whirling toys, interest in and enjoyment of which is largely due to the production of changing color effects, and it has for its object to provide an improved and attractive toy of this general character that will be certain and convenient as to operation but which may be produced at a low cost. The invention contemplates a rotary toy suspended from a string or cord by the manipulation of which it is operated and caused to climb and descend thereon, alternately, and the improvements are directed in part toward the provision of means whereby a color controlling element is mounted and caused to change the apparent color or the color effect upon each reversal of movement and toward the provision of an impeller whereby the downward progress of the whirling body may be accelerated. To these and other ends, the invention resides in certain improvements and combinations of parts, all as will be hereinafter more fully described, the novel features being pointed out in the claims at the end of this specification.

In the drawing.

Similar reference numerals throughout the several views indicate the same parts.

Figure 1:
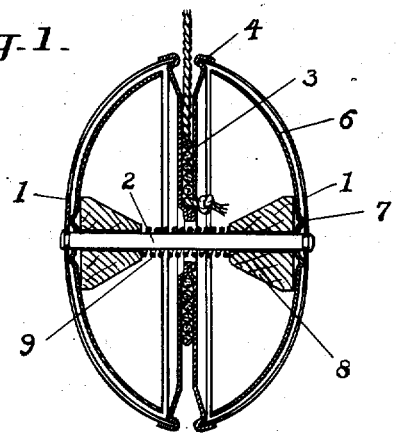
Fig. 1 is a vertical central section with the operating cord broken away of a toy constructed in accordance with and illustrating one embodiment of my invention.
Figure 2:
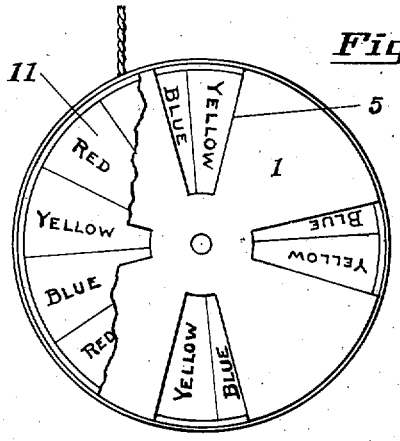
Fig. 2 is a side elevation, partly broken away to reveal the interior element.

Referring first to the construction shown in Figs. 1 and 2, I provide an outer or body element, indicated generally at 1, which has the form of a flattened sphere. It consists of a sheet metal shell, in the present instance, composed of two semi-spheroidal parts connected by a central shaft 2 to the ends of which they are riveted. A central winding drum 3, through which the shaft 2 passes with a clearance, is composed of two spaced metal disks, as shown, the edges of which meet the edges of the shell elements 1 and are secured thereto in a seam at 4. The shell pieces 1 are provided with a plurality of equally spaced openings 5.

In each compartment, as it were, that result from this construction, is an element 6 turning freely on the shaft 2. The resulting rotation of the body relative to the element is taken advantage of to change the appearance of the body, this change being visible through the windows 5. In the present case the elements 6 are substantially semi-spheroidal or convex color elements. Each element has the general conformation of the adjacent shell piece 1 and is held in slightly spaced relationship thereto by an annular boss 7 that frictionally engages the shell piece near the bearing. Hub pieces 8 on the shaft press against the insides of the color elements 6 in the region of these friction bosses under the influence of an intermediate spring 9 coiled about the shaft and extending through the drum 3. An operating cord 10 has its end secured to the latter and is adapted to wind thereon in a single spiral, as indicated in Fig. 1, the drum itself being very narrow. The outer faces of the color elements 6 are divided into segmental areas 11 corresponding to the openings 5 in the shell and these areas are contrastingly colored, preferably with the primary colors, as indicated. The operation of the device is as follows:

The cord 10 is wound upon the drum, as in Fig. 1, and the upper end held in the hand, while the toy body is allowed to drop. Its unwinding from the cord imparts rotation to it in one direction and when it abruptly reaches the end of the cord length, this rotation persists and causes it to rewind itself and climb upon the cord assisted by the skillful manipulation of the upper end of the cord by the operator in a well known manner. This is repeated again and again. Each time the speed of rotation of the shell or body member is abruptly retarded, as it is when it reaches the limit of the string at the bottom or at the top of its travel, there occurs an overrunning of the color element 6 due to its inertia. As the toy whirls in a given transit of the cord, it appears, generally, of a color such as that on the elements 6 that are in register with the openings 5. Thus, in Fig. 2, the registration is partly blue and partly yellow so persistency of vision will give a green effect. When the beforementioned overrunning of the color elements occurs, there is a resetting of the color elements, that is, they will change their positions relatively of the openings 5 and another color or combination of colors will register. The function of the friction controlling assembly on the shaft, namely, the spring 9, hubs 8 and friction bosses 7, is to permit the overrunning but to thereafter maintain the color disks at a given registration while winding or unwinding is progressing. Otherwise there would be a blurred effect not so pleasing as a sustained color. The shell 1 with its openings 5 constitutes, in effect, a shutter that screens off selectively though arbitrarily all but a given color or combination of colors. The strength of compression of the spring 9 is regulated to the area of the frictional contact at 7 and the weight of the parts, as will be understood by one skilled in the art.

Figure 3:
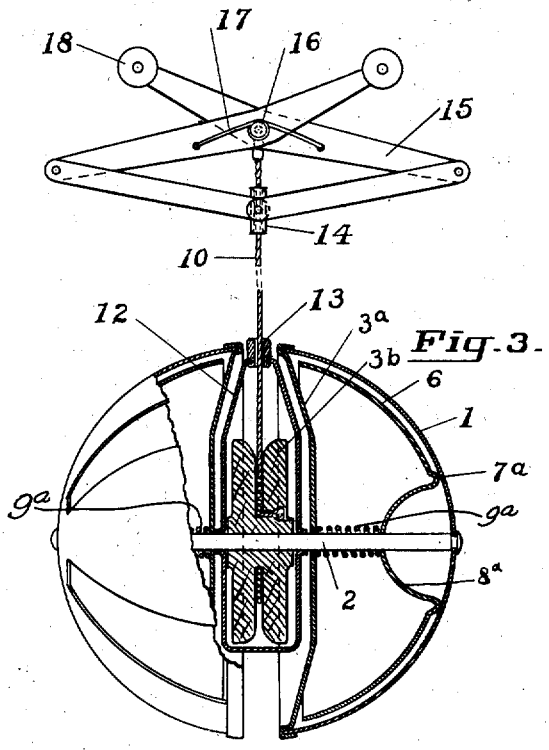
Fig. 3 is a view corresponding to Fig. 1 of a modification of the invention, the same being shown, however, partly in elevation and one form of impeller means being shown in side elevation in connection with the cord.

In the form of the invention shown in Fig. 3, where corresponding reference numerals are used for the major parts, instead of the hubs 8, I punch in the centers of the color elements 6 at 8*a* to bring their bearings on the shaft 2 nearer their centers of gravity. This stabilizes them in another way to avoid tilting and contact with the outer shell. The friction bosses are provided at 7*a* substantially as before. The inner plates 3*a* do not form the drum but form a space for the occupancy of a separate drum 3*b*. Two springs 9*a* are employed instead of one, being interposed between plates 3*a* and the portions 8*a* of the disks.

Figure 4:
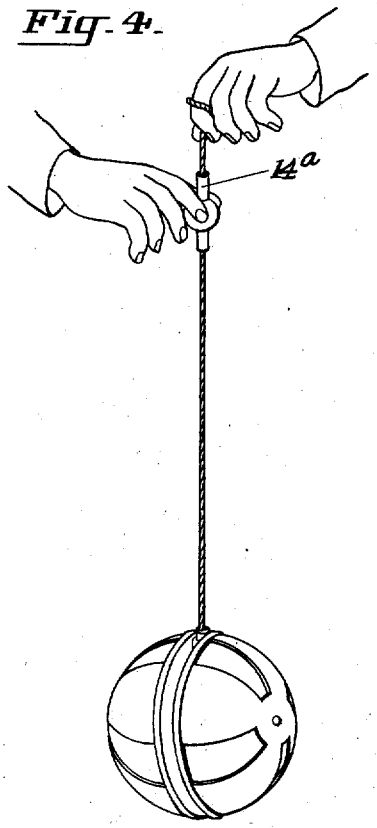
Fig. 4 is a perspective view of the device of Fig. 3 on a reduced scale showing a different form of impeller.

In connection with this construction, I have illustrated an impelling means for accelerating the downward travel of the toy body. Embracing the drum 3*b* is a yoke 12 free on the shaft 2 and carrying a guide 13 for the cord 10 that projects slightly free of the toy body. Slidable on the cord is a tubular element 14 which may be drawn down abruptly against the guide 13 to give an impulse to the toy body. Mechanical means is here shown for operating the slide which consists of a lazy tongs 15, to the pivot 16 of which the upper end of the cord is attached. A spring 17 on this pivot contracts the tongs as in the figure but when the finger pieces 18 are pinched together they are extended and the impulse communicated to the toy body, as stated. In Fig. 4, this impeller has the simpler form of a tube 14*a* free on the cord and having an enlarged portion to be grasped by one of the operator's hands while the end of the cord is held with the other.

An impeller of one kind or another is particularly useful when the toy is being used by a small child, for instance, as it furnishes rapid rotation more quickly than would the normal gravitation through which the unwinding occurs. Also, the guide 13 is more than a mere abutment for the impeller. It holds the cord from scraping contact with parts other than the drum itself and gives it a certainty of direction that prevents the globular form of Fig. 3, particularly, from having a tendency to weave.

I claim as my invention:

1. In a gravity operated reversing whirling toy of the bandelore type, the combination with a rotatable body element having a winding center and a supporting cord attached thereto and adapted to be wound in the latter whereby the body element will unwind downwardly on the cord by gravitation and climb thereon by rewinding through its own rotational momentum, of a color element having variously colored exposed surfaces mounted to turn relatively to the body element, such relative turning movement being caused by differences in freedom of motion of the elements and being adapted to produce a changing chromatic effect.

2. In a whirling toy of the bandelore type, the combination with a rotatable body element embodying a shell having shutter openings therein and a winding center and a cord adapted to be wound in the latter whereby the shell will unwind on the cord by gravitation and climb thereon by rewinding through its own momentum, of an element within the shell viewable through the openings and adapted to rotate relatively thereto because of differential inertias of the elements, the inner element being contrastingly colored to produce a chromatic effect.

3. A whirling toy in accordance with claim 1 characterized further by the fact that there is provided a color element on each side of the winding center.

4. A whirling toy in accordance with claim 1 characterized further by the fact that the color element frictionally contacts the body element and means is provided for controlling such contact.

5. A whirling toy in accordance with claim 1 characterized further by the fact that the color element frictionally contacts the body element and spring means is provided for inducing such friction.

6. A whirling toy in accordance with claim 1 characterized further by the fact that the color element frictionally contacts the body element on a limited area and spring means is provided for inducing such friction.

7. A whirling toy in accordance with claim 1 further characterized by the fact that it has a color element on each side of the winding center that frictionally contacts the body element and means is provided for controlling such contact and there is provided a shaft carried by the body upon which the color elements turn, said elements being substantially semi-spherical and being provided with reentrant bearing portions to bring their planes of support nearer to their centers of gravity.

8. A whirling toy in accordance with claim 1 further characterized by the fact that it has a color element on each side of the winding center that frictionally contacts the body element and means is provided for controlling such contact comprising axial hubs rotatable with the color elements and a spring for thrusting them apart against the respective color elements to make the frictional contact with the body element.

9. A whirling toy in accordance with claim 1 further characterized by the fact that it has a color element on each side of the winding center that frictionally contacts the body element and means is provided for controlling such contact comprising a spring for thrusting the color elements against the body elements to make the frictional contact and a central connecting shaft upon which the parts are concentrically mounted.

10. In a gravity operated reversing whirling toy, the combination with a body element having a central shaft fixed thereto, of a drum thereon constituting a winding center, a supporting cord attached to the winding center and adapted to be wound in the latter whereby the body element will unwind downwardly on the cord by gravitation and climb thereon by rewinding through its own rotational momentum, a device free on the shaft within the body element and acting as a guide for the cord, and a sliding impeller on the cord adapted to strike the guide.

11. In a gravity operated reversing whirling toy, the combination with a body element having a central shaft fixed thereto, of a drum thereon constituting a winding center, a supporting cord attached to the winding center and adapted to be wound in the latter whereby the body element will unwind downwardly on the cord by gravitation and climb thereon by rewinding through its own rotational momentum, a device free on the shaft within the body element and acting as a guide for the cord, a lazy tongs to which the cord is attached, and an impeller on the lazy tongs slidable on the cord and adapted to strike the guide.

12. In a gravity operated reversing whirling toy of the bandelore type, the combination with a rotatable body element having a winding center and a supporting cord attached thereto and adapted to be wound in the latter whereby the body element will unwind downwardly on the cord by gravitation and climb thereon by rewinding through its own rotational momentum, of a member mounted within the body element in such a manner as to turn relatively to the body element, such relative turning movement being caused by a freedom of motion of said member relative to the body element.

13. In a gravity operated reversing whirling toy of the bandelore type, the combination with a rotatable body element having hollow halves with a winding center and a supporting cord attached thereto and adapted to be wound in the latter whereby the body element will unwind downwardly on the cord by gravitation and climb thereon by rewinding through its own rotational momentum, of a member mounted within each half of the body element on the axis of rotation of the body element in such a manner as to turn relatively to the body element, such relative turning movement being caused by a freedom of motion of said member relative to the body element.

14. In a gravity operated reversing whirling toy of the bandelore type, the combination with a rotatable body element having windowed hollow halves with a winding center and a supporting cord attached thereto and adapted to be wound in the latter whereby the body element will unwind downwardly on the cord by gravitation and climb thereon by rewinding through its own rotational momentum, of a member mounted within each half of the body element on the axis of rotation of the body element in such a manner as to turn relatively to the body element, such relative turning movement being caused by a freedom of motion of said member relative to the body element, and causing a change in appearance viewable through the windows in the body element.

15. In a whirling toy of the bandelore type, the combination with a rotatable body element embodying a shell having windows therein and a winding center and a cord adapted to be wound in the latter whereby the shell will unwind on the cord by gravitation and climb thereon by rewinding through its own rotational momentum, of a member within the shell viewable through the windows and free to rotate relatively thereto, a resultant rotation being produced because of differential inertias of the shell and member.

16. In a whirling toy of the bandelore type, the combination with a rotatable body element having halves each embodying a shell with windows therein and a winding center and a cord adapted to be wound in the latter whereby the shell will unwind on the cord by gravitation and climb thereon by rewinding through its own rotational momentum, of a member mounted within each half of the shell on the axis of rotation of the body element and viewable through the windows and free to rotate relatively to the body element, a resultant rotation being produced because of differential inertias of the shell and member, and serving to cause a change in appearance of the toy.

EDWARD S. SAVAGE.